United States Patent
Bhat et al.

(10) Patent No.: US 7,296,235 B2
(45) Date of Patent: Nov. 13, 2007

(54) PLUGIN ARCHITECTURE FOR EXTENDING POLICES

(75) Inventors: Shivaram Bhat, Sunnyvale, CA (US); Hua Cui, Fremont, CA (US); Ping Luo, Union City, CA (US); Dilli Dorai Minnal Arumugam, Cupertino, CA (US); Aravindan Ranganathan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 813 days.

(21) Appl. No.: 10/269,152

(22) Filed: Oct. 10, 2002

(65) Prior Publication Data

US 2004/0070604 A1     Apr. 15, 2004

(51) Int. Cl.
 *G06F 3/00* (2006.01)
(52) U.S. Cl. ...................... 715/744; 715/747
(58) Field of Classification Search ............... 715/744, 715/747, 764; 709/228, 229, 223
See application file for complete search history.

(56) References Cited

U.S. PATENT DOCUMENTS

| | | | |
|---|---|---|---|
| 5,434,974 A | 7/1995 | Loucks et al. | |
| 5,544,322 A | 8/1996 | Cheng et al. | |
| 5,850,511 A | 12/1998 | Stoecker et al. | |
| 6,026,440 A | 2/2000 | Shrader et al. | |
| 6,092,196 A | 7/2000 | Reiche | |
| 6,226,666 B1 | 5/2001 | Chang et al. | |
| 6,233,618 B1 | 5/2001 | Shannon | |
| 6,362,836 B1 | 3/2002 | Shaw et al. | |
| 6,513,158 B1 * | 1/2003 | Yogaratnam | 717/166 |
| 6,539,430 B1 | 3/2003 | Humes | |
| 6,687,229 B1 | 2/2004 | Kataria et al. | |
| 6,799,208 B1 * | 9/2004 | Sankaranarayan et al. | 709/223 |
| 6,920,494 B2 * | 7/2005 | Heitman et al. | 709/223 |
| 6,957,261 B2 * | 10/2005 | Lortz | 709/226 |
| 7,028,181 B1 | 4/2006 | McCullough et al. | |
| 7,092,370 B2 | 8/2006 | Jiang et al. | |
| 2001/0044894 A1 | 11/2001 | Saito et al. | |
| 2002/0010768 A1 | 1/2002 | Marks et al. | |
| 2002/0010785 A1 | 1/2002 | Katsukawa et al. | |
| 2002/0046268 A1 | 4/2002 | Leong et al. | |
| 2002/0138763 A1 | 9/2002 | Delany et al. | |
| 2002/0169907 A1 | 11/2002 | Candea et al. | |
| 2002/0184535 A1 | 12/2002 | Moaven et al. | |
| 2002/0186238 A1 | 12/2002 | Sylor et al. | |

(Continued)

FOREIGN PATENT DOCUMENTS

EP     1009130 A1     6/2000

*Primary Examiner*—Kieu D. Vu
(74) *Attorney, Agent, or Firm*—Osha Liang LLP

(57) ABSTRACT

An architecture for allowing extensibility to policies. The architecture has a policy component program that is able to evaluate and enforce polices. The architecture also has plugin modules for allowing a user to customize the polices. The policy component program is able to present interfaces to the user for customizing the polices. The policy component program is further able to integrate customized polices into a framework of the policy component program in response to user input that is based on the interfaces presented to the user. The presented interfaces may be for defining subjects in the policy program, defining conditions in the policy program, defining referrals in the policy program, defining resource names in the policy program, and defining how conflicts will be resolved in the policy program. The interfaces may be compliant with the JAVA programming language.

27 Claims, 4 Drawing Sheets

U.S. PATENT DOCUMENTS

| | | |
|---|---|---|
| 2002/0188513 A1 | 12/2002 | Gil et al. |
| 2003/0018786 A1 | 1/2003 | Lortz |
| 2003/0074580 A1 | 4/2003 | Knouse et al. |
| 2003/0074648 A1 | 4/2003 | Braud et al. |
| 2003/0079147 A1 | 4/2003 | Hsieh et al. |
| 2003/0088648 A1 | 5/2003 | Bellaton et al. |
| 2003/0088786 A1* | 5/2003 | Moran et al. ............... 713/201 |
| 2003/0093509 A1* | 5/2003 | Li et al. .................... 709/223 |
| 2003/0115322 A1 | 6/2003 | Moriconi et al. |
| 2003/0204619 A1* | 10/2003 | Bays ......................... 709/238 |
| 2004/0054791 A1 | 3/2004 | Chakraborty et al. |
| 2004/0103170 A1 | 5/2004 | Borzilleri et al. |
| 2004/0128615 A1 | 7/2004 | Carmel et al. |
| 2004/0165007 A1* | 8/2004 | Shafron ..................... 345/781 |
| 2004/0213258 A1 | 10/2004 | Ramamoorthy |
| 2004/0267749 A1 | 12/2004 | Bhat et al. |
| 2005/0021818 A1 | 1/2005 | Singhal et al. |
| 2005/0021978 A1 | 1/2005 | Bhat et al. |
| 2005/0117576 A1 | 6/2005 | McDysan et al. |

\* cited by examiner

PLUGIN ARCHITECTURE FOR EXTENDING POLICES

BACKGROUND OF THE INVENTION

1. Field of the Invention

The field of the invention relates to data processing. More specifically, embodiments of the present invention relate to allowing extensions to user policies for defining access to resources or services.

2. Related Art

Computer systems typically include a combination of hardware (e.g., semiconductors, circuit boards, etc.) and software (e.g., computer programs). As advances in semiconductor processing and computer architecture push the performance of computer hardware higher, more sophisticated computer software has evolved to take advantage of the higher performance of the hardware.

Other changes in technology have also profoundly affected how people use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a central software application running on one computer system. As a result of sharing a software application with numerous users, policies are defined and enforced that control the access and use of resources, such as applications on a server system. Policies may protect other resources and services, as well.

Referring now to Prior Art FIG. 1, a block diagram of a generic server system 10 is shown. The generic server system 10 comprises a user 20 connected to a server 21 by a data connection 24. Typically, the user 20 will access an application 22 that is stored on server 21 over the Internet. In a corporate environment, the user 20 could be connected to the server 21 by an internal network, for example, an Intranet. In addition, server 21 stores a set of user policies in a database 23 for authenticating access to software application 22. Typically, the user policy database 23 comprises user names and associated passwords. When a user provides credentials to access secure applications, the credentials are checked against the stored values.

It may be stated that the policies determine who can do what to whom under what conditions. In the previous statement, the who may be, for example, a person, a service, or an application. The whom may be, for example, a resource or service to which access is sought. The condition may be, for example, based on time, class of user, etc. Only if the condition is met will the resource or service be made available.

Typically, organizations require a wide variety of policies, depending on factors such as the resource or service to protect and the user seeking access. For example, one set of user policies defined for a human resources server prevent other personnel from viewing confidential salary information and other sensitive data. Another set of user policies for an engineering server allow authorized personnel from many internal segments of a company to publish and share research and development information. Such user policies restrict external partners from gaining access to proprietary information while allowing access to the correct people inside an organization.

Clearly, organizations require a myriad of different policies to adequately protect their resources and services. Thus, it is beneficial to create user policies that are tailored for the specific environment. However, creating and managing the enormous range of user policies needed can be a hindrance to the performance of a server system because the server accesses a very large user policy database each time an application is accessed.

Moreover, it is very difficult to anticipate the policy that is best suited to protect the resource in question, when providing a system such as in FIG. 1. Hence, the most effective user policies cannot be put into place at the time the system is initially installed.

A still further concern is that organizations are constantly evolving. Hence a set of polices that were put into place initially may fail to provide adequate protection or may overprotect as the organization evolves.

Therefore, a problem with conventional methods of providing a policy system is that the policies that are delivered with the system may fail to be tailored to the user's requirements. A still further problem is that the system may require an enormous number of policies to cover the different conditions an organization may face and hence system performance may be poor. A still further problem is that it is impossible to anticipate an organization's present and future requirements and hence the policies that are first installed with a system may not be the most effective at protecting services and resources.

SUMMARY OF THE INVENTION

The present invention provides a computer-controlled method for allowing customized extensions to policies. Embodiments of the present invention provide a policy system that may be tailored to an organization's needs. Embodiments of the present invention provide a high-performance policy system. Embodiments of the present invention provide a policy system that allows a user to design effective policies to meet the organization's unique and changing requirements. The present invention provides these advantages and others not specifically mentioned above but described in the sections to follow.

In one embodiment, an architecture for allowing extensibility to policies is presented. One embodiment of the present invention comprises a computer readable medium having stored therein a policy component. The policy component comprises a policy program for evaluating and enforcing pre-defined policies. The policy component further comprises a plurality of interfaces for defining customized policies in the policy program. The policy component is operable to receive user defined customized policies and integrate the customized policies into the policy program.

Another embodiment is an architecture for extending policies. The architecture comprises a computer readable medium having stored thereon instructions for implementing a policy component program. The policy component program is able to evaluate and enforce polices. The architecture also has plugin modules for allowing a user to customize the polices. The policy component program is able to present interfaces to the user for customizing the polices. The policy component program is further able to integrate customized polices into a framework of the policy component program in response to user input that is based on the interfaces presented to the user.

Another embodiment of the present invention is a computer-implemented method of allowing policy customization. The method comprises providing an interface that defines how to create a customized policy in a policy program. Next, a user supplied policy definition that is compliant with the provided interface is received. Then, the user supplied policy definition is integrated into the policy program. In this fashion, a policy in the policy program is extended to include the user customization.

In various embodiments of the present invention the interface is for defining subjects in the policy program, defining conditions in the policy program, defining referrals in the policy program, defining resource names in the policy program, and defining how conflicts will be resolved in the policy program. In some embodiments, the interface is compliant with the JAVA programming language.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
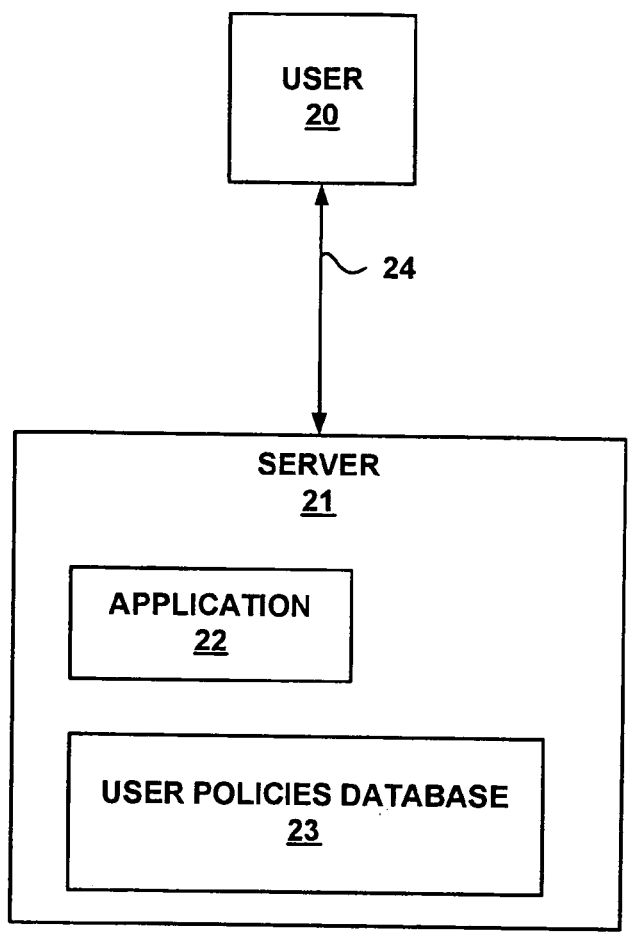
FIG. 1 is a block diagram of a prior art server system including an application stored on a server available to a user over a network connection.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "instantiating," "storing," "providing," "receiving," "sending," "integrating," "entering," or the like, refer to the action and processes (e.g., process 300) of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Customized Extensions to Policies

Embodiments of the present invention allow for policies to be extended by a user. The policies may contain rules, subjects and conditions that are evaluated to determine whether a resource or service will be made available to the subject seeking access.

The following is an exemplary format that may be used to define a policy, although embodiments of the present invention are not so limited.

[[Rule] [Subject] [Referral] [Condition]]

There may be one or more rules in the policy. Moreover, a policy may be defined without a subject, referral, and/or condition. An application (or service) can have more than one policy associated with it. Examples of having multiple policies for an application (or service) would typically exist in a ISP (Internet Service Provider) and ASP (Application Service Provider) environments hosting multiple organizations and each organization having its own specific policy.

A rule may specify the resources or services that are to be protected and the actions allowed. A resource may be, for example, a website or an application. For example, the resource could be a uniform resource locator (URL) of a website. The following is an exemplary rule, although embodiments of the present invention are not so limited.

[Service/Resource] [<Action>:<ActionValues>]]

Using an example in which the resource is a website, an action may be a get, put, delete, or post operation according the hypertext transport protocol (HTTP). Using an example in which the resource a paycheck application, the action may be, for example, changing a salary or giving a bonus.

For each action, there may be an action value, such as, allow/deny or yes/no. Thus, the action value may define whether the action is permitted.

The previous examples illustrate binary actions. Non-binary actions are possible, as well. For example, a catalog service could have the following actions: allowedDiscount, purchaseOptions, etc. Another example is a calendar service, which may have the following actions: maximumQuota, notificationMechanism, etc. For the catalog service the allowedDiscount action may have a number as its action value, and similarly maximumQuota action for Calendar server. However, the actions purchaseOptions and notificationMechanism specified for the catalog and calendar services respectively may have certain pre-defined strings as its action values. Hence action values may be arbitrary, e.g., Boolean, numeric, string, single value or multi-valued.

A subject may define a collection of users to whom the policy applies. In other words, a subject may refer to a user (or an entity) accessing a service (or an application). Usually, persons or entities identify themselves during the authentication process. Once they have been authenticated, they are provided with one or more identities called 'principal.' The term 'principal' may refer to an identify of the user (or an entity) as represented (or understood) by an application, or a server, or a device.

Hence, a subject may represent a collection of identities, wherein each identity is represented as a principal. For example, Jane Doe is a subject. Jane Doe may have a first e-mail account under the principal name 'jdoe', a second e-mail account under the principal name 'janedoe' and an e-commerce buyer service account under the principal name 'jane_doe'. Thus, the same subject, Jane Doe, has three principal names (or identities) based on which service she accesses. Principals usually become associated with a subject upon successful authentication to a service. Since a subject may represent a nameless container holding relevant information for a user, while principals may represent named identities for that subject, the set of permissions granted to a subject depends on the principals associated with that subject and not on the subject itself.

When a resource is subject to an access control policy, a request for access to the resource is evaluated by a "policy evaluator." The policy evaluator may be also referred to as a policy decision point or as a policy engine. The policy evaluator returns a "policy decision." A policy decision refers to the value(s) returned by the policy evaluator. For example, in the case of Boolean action, values for the policy decision may be true/false (or allow/deny or yes/no). The policy decision can be used to grant access to a resource, and to define the actions that may be performed on or using the resource after access is gained.

The referral may involve a concept of forwarding the request for the policy decision. In an ISP/ASP environment (and possibly within an enterprise) it may be necessary to delegate the policy definitions and decisions for a resource to other organizations or sub-organizations. Additionally it is possible to delegate the policy decisions for a resource to other policy products. Taking the example of a web service, an ISP may refer the policy decision for the resource represented by the URL for ACME to the ACME organization, and similarly for the resource represented by a SUN URL resource to the SUN organization. The referral concept is described in co-pending U.S. patent application Ser. No. 10/269,957, filed concurrently herewith, entitled "POLICY DELEGATION FOR ACCESS CONTROL," by Bhat et al., and assigned to the assignee of the present invention and incorporated herein by reference.

According to the present embodiment of the present invention, either a first policy engine or a second policy engine will perform the policy evaluation and return policy values (policy decisions) for enforcement. Which of these policy engines performs the policy evaluation depends on whether or not a referral policy for the resource of interest is in place in the first policy engine. In essence, if a referral policy applicable to the resource of interest is in place, the policy evaluation is performed by the second policy engine; otherwise, the policy evaluation is performed by the first policy engine.

A condition may represent the constraints on a rule or a policy. For example, a constraint may be that an action of updating a catalog may only take place from 8:00 AM-8:00 PM. Another constraint may grant this action only if the request originates from a given set of IP addresses or from the company Intranet.

A policy component may have a policy program for evaluating and enforcing pre-defined policies. Moreover, the policy component allows a user to extend the pre-defined polices in a very efficient and simple manner. The policy component may have at least one module for presenting an interface for defining customized policies in the policy program. For example, the module is able to make the interface available to an administrator or client. Tables 1-4 herein illustrate several exemplary interfaces, which those of ordinary skill in the art will recognize provide guidelines for a user (e.g., administrator) to write a small piece of code that may serve as an extension to a policy. The policy component is able to receive the user-defined extensions and to integrate the extensions into the policy program. In this fashion, the user is allowed to write their own customized version of the generic polices that may be pre-defined. Advantageously, the user does not need to write an entire new policy.

Figure 2:
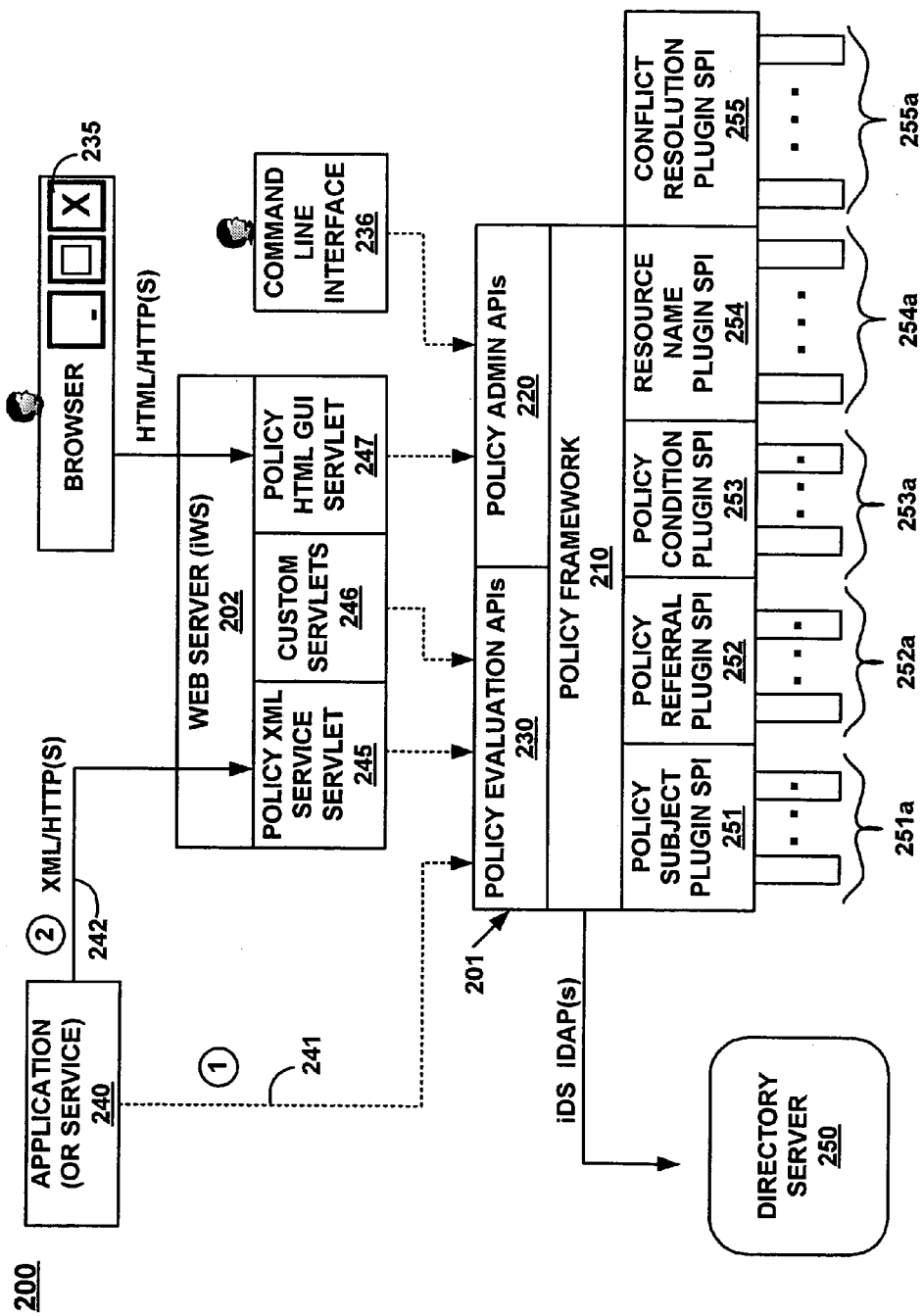
FIG. 2 is a diagram of a policy component architecture, according to an embodiment of the present invention.

FIG. 2 illustrates an exemplary policy architecture 200 that may be used in the implementation of embodiments of the present invention. The policy architecture 200 comprises a policy component 201, which contains a policy framework 210 that executes the policies set by the administrators. The policy component 201 has policy evaluation Application Programming Interfaces (APIs) 230, which may be an interface for policy evaluation (e.g., for applications or services to determine user's privileges). As shown in FIG. 2, the target audience for policy evaluation APIs 230 may be applications (and services) invoking these interfaces directly.

The policy component 201 has policy administrator APIs 220, which may be for administrators to manage (e.g., set/modify/delete) policy rules. The target audience for policy administrator APIs 220 may be administrators managing the policies via either a browser 235 (e.g., using html/http) or command line interfaces 236. The policy administrator APIs 220 and the policy evaluation APIs 230 may be implemented with Java or C, although embodiments of the present invention are not so limited.

Still referring to FIG. 2, the policy architecture 200 also has a web server interface 202. The end-user may access the policy component 201 by an application or service 240 through the web server interface 202, although this is not required. The application or service 240 has numerous ways to reach the policy component 201. For example, path 241 may be implemented by a JAVA interface. If an application 240 is written in another language, the XML interface 245 may be used to reach the policy component 201 via path 242. Still other techniques may be used, such as, for example, JNI (JAVA Native Interface) to evaluate policies. The web server interface 202 also has custom servlets 246 and policy HTML GUI servlet 247.

The Policy Framework 210 may connect to a directory server 250 using, for example, LDAP(s). The directory server 250 may store the various policy rules.

In some cases, an application 240 may have a firewall separating it from the directory server 250, which may not allow LDAP traffic (although the firewall may allow http traffic). In order to support this application 240 (written in languages other than Java and C), and to overcome firewall issues, the policy XML service servlet 245 may be used. Hence, applications 240 can construct policy queries using XML and either evaluate the policy or get the policy definitions via the policy XML service servlet 245.

The policy component 201 may provide many different types of plugin interfaces, allowing for user customization or extensions to policies. FIG. 2 illustrates five such plugin interfaces, although embodiments of the present invention are not limited to those five. They are shown in FIG. 2 as subject plugin SPI (Service Provider Interface) 251, policy referral plugin SPI 252, policy condition plugin SPI 253, resource name plugin SPI 254, and conflict resolution plugin SPIs 255. Each of which may plug into the policy framework 210.

As shown in FIG. 2, the policy component 201, by default, may provide generic plugins for these SPIs (251-255). Users can plug in their own customized modules, which are represented as 251a-255a). There may be multiple user-defined modules of each type. Plugins may be installed and configured using the policy admin APIs 220 or using the interface to the policy framework, although embodiments of the present invention are not so limited. Exemplary plugin interfaces are illustrated in Tables 1-4.

Further details of a policy architecture that may be used in embodiments of the present invention are described in co-pending U.S. patent application Ser. No. 10/246,072, filed Sep. 17, 2002, entitled "A SYSTEM AND METHOD FOR ENFORCING USER POLICIES ON A WEB SERVER," by Chakraborty et al., and assigned to the assignee of the present invention and incorporated herein by reference.

Figure 3:
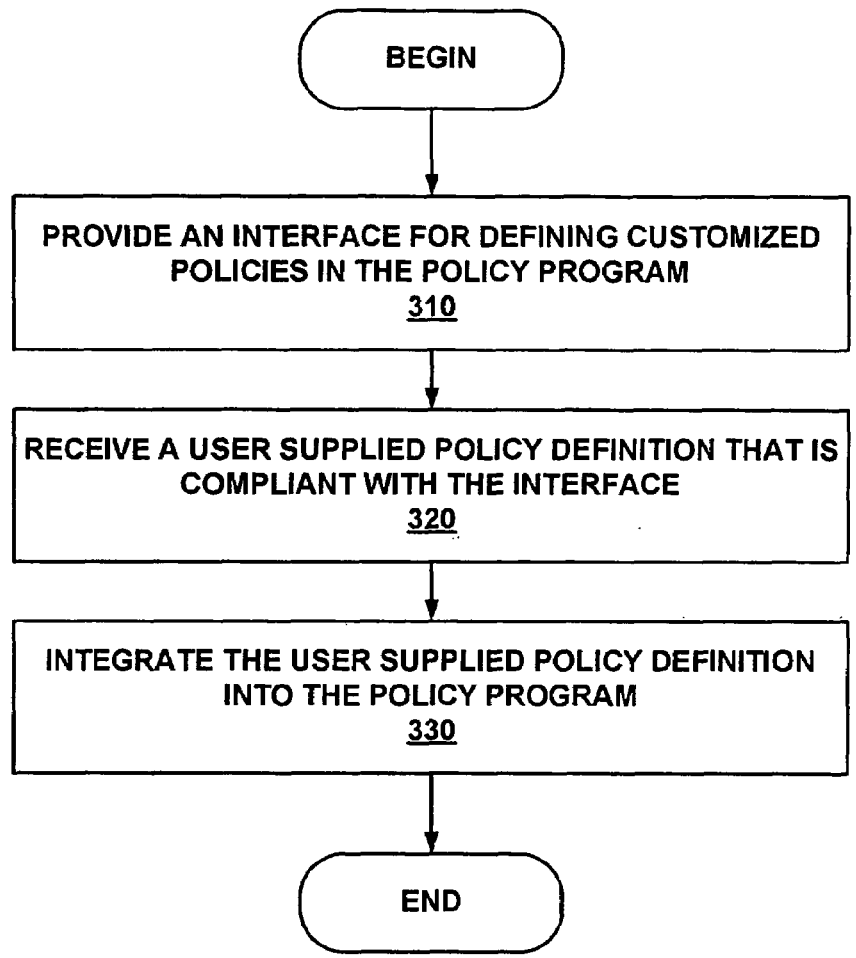
FIG. 3 is a flowchart illustrating steps of a process of allowing customized extensions to policies, according to an embodiment of the present invention.

An embodiment of the present invention provides for a method of allowing extensions to be added to policies. Steps of process 300 of FIG. 3 may be stored as instructions on a computer readable medium and executed on a general-purpose processor. For example, computer system 112 in FIG. 4 or the like may be used to implement process 300. In step 310, an interface for defining customized policies in a policy program is provided, in response to a request for the interface.

For example, a policy administrator may access the policy program through a command line interface, a browser, or an application as shown in FIG. 2. Once the administrator has accessed the policy program, the administrator may be able to select from among several interfaces. Once selected, the policy program initiates steps such that the interface is displayed to the administrator. The administrator may now write a small piece of code, using the interface as a guideline. Exemplary interfaces are shown in Tables 1-4.

In step 320, a user supplied policy definition that is compliant with the interface is received. For example, the policy program receives the code that the administrator wrote based on the interface. As discussed herein, this allows the user to modify a condition, subject, referral, resource name, etc.

In step 330, the user supplied policy definition is integrated into the policy program. In this fashion, the extension to the policy may be available whenever a relevant policy decision is made. Process 300 then ends.

Exemplary Interfaces

Various embodiments of the present invention provide for interfaces that may be used to extend policies. Tables 1-4 describe four such interfaces; however, embodiments of the present invention are not limited thereto.

An embodiment of the present invention is an interface that may define a method to extend the subject of a policy. Table 1 represents an exemplary interface suitable for extending subjects.

TABLE 1

```
*******************************************************************
public interface Subject {
/**
 * Determines if the user belongs to this instance
 * of the <code>Subject</code> object.
 * For example, a Role implementation
 * would return <code>true</code> if the user belongs
 * the specified role; <code>false</code> otherwise.
 *
 * @ param token single-sign-on token of the user
 *
 * @ return <code>true</code> if the user is member of the
 * given subject; <code>false</code> otherwise.
 *
 * @ exception SSOException if SSO token is not valid
 * @ exception PolicyException if an error occurred while
 * checking if the user is a member of this subject
 */
public Boolean isMember(SSOToken token)
throws SSOException, PolicyException;
}
*******************************************************************
```

The interface in Table 1 describes the parameters (param), the returned value, the exceptions thrown, as well as method(s). Thus, by writing suitable code that complies with the defined method(s) a user may extend the policy. Table 1 defines a method(s) to determine if a user (e.g., as identified by SSO (single-sign-on) token) is a member of this subject. The class '<code>Subject</code>' may define a collection of users (or subjects to whom the specified policy is applied. A complete implementation of the interface in Table 1 may have complex Boolean operations to determine if the given user identified by the <code>SSOToken</code> belongs to this collection. The interfaces may separated into administrative interfaces and evaluation interfaces. The administrative interfaces may be used by policy HTML GUI or command line interface (e.g., FIG. 2, 247, 236) to create a <code>Subject</code> object. The evaluation interfaces may be used by the policy evaluator.

An embodiment of the present invention is an interface for extending conditions in a policy. The exemplary interface in Table 2 defines method(s) to constrain a policy based on parameters other than user's credentials.

Referring to Table 2, the constraint may be the time of the day, IP address, etc. The class <code>Condition</code> may define an interface to allow pluggable condition. These may be used to control policy decisions based on parameters such as time, authentication level of the user session, and IP address from which the user is making the request. A condition may compute a condition decision based on the state of condition object and the environment passed in a map of key/value pairs. Condition Decision may encapsulate whether a policy applies for the request and advice messages generated by the condition.

Another embodiment of the present invention provides for extending policies based on a referral. The exemplary interface in Table 3 defines methods to delegate a resource to other organizations or other policy servers.

TABLE 2

```
****************************************************************
public interface Condition {
/**
* Gets the decision computed by this condition object, based on the
* map of environment parameters
*
* @ param token single-sign-on token of the user
* @ param env request specific environment map of key/value pairs
*
* For example, this would contain IP address of remote client for an
* IPCondition
*
* @ return the condition decision.
*
*The condition decision encapsulates whether a policy applies for the
* request and advice messages generated by the condition.
*
* Policy framework continues evaluating a policy only if it applies
* to the request as indicated by the ConditionDecision. Otherwise,
* further evaluation of the policy is skipped. However, the advice
* messages encapsulated in the ConditionDecision are aggregated
* and passed up, encapsulated in the policy decision.
*
* @ throws PolicyException if the decision could not be computed
* @ throws SSOException if SSO token is not valid
*
* @ see com.sun.identity.policycom.sun.identity.policy.ConditionDecision
*/
public ConditionDecision getConditionDecision(SSOToken token, Map env)
throws PolicyException, SSOException;
}
****************************************************************
```

TABLE 3

```
****************************************************************
public interface Referral {
/**Gets policy results
* @ param token SSOToken
* @ param resourceType resourceType
* @ param resourceName name of the resource
* @ param resourceName name of the resource
* @ param actionNames a set of action names
* @ param envParameters a map of environment parameters.
* Each key is an environment parameter name.
* Each value is a set of values for the parameter.
* @ return policy decision
*
* @ throws PolicyException
* @ throws SSOException
*/
PolicyDecision getPolicyDecision(SSOToken token, String resourceType, String
resourceName, Set actionNames, Map envParameters)
throws SSOException, PolicyException;
}
****************************************************************
```

Referring to Table 3, there may be many implementations with different policy delegation mechanisms such as delegating to peer organizations only or delegating to sub organizations only.

Another embodiment of the present invention provides for extending policies based on a resource name. The exemplary interface in Table 4 defines methods to work with resource names for a given service type.

TABLE 4

```
****************************************************************************
public interface ResourceName {
/**
* Compares two resources.
*
* @ param origRes name of the resource which will be compared
* @ param compRes name of the resource which will be compared with
* @ param wildcardCompare flag for wildcard comparison
*
* @ return returns <code>ResourceMatch</code> that
* specifies whether the resources are exact match or otherwise.
*
* ResourceMatch.NO_MATCH means two resources do not match
* ResourceMatch.EXACT_MATCH means two resources match
* ResourceMatch.SUB_RESOURCE_MATCH means compRes is the
* sub resource of the origRes
* ResourceMatch.SUPER_RESOURCE_MATCH means compRes is the
* super resource of the origRes
* ResourceMatch.WILDCARD_MATCH means two resources match with
* respect to the wildcard
*/
public ResourceMatch compare(String origRes, String compRes, Boolean
wildcardCompare);
}
****************************************************************************
```

Referring to Table 4, the exemplary method(s) check if two resource names are the same, or if one is a sub-resource of the other, etc. Service developers may provide an implementation of an interface that will determine the hierarchy of resource names during policy evaluation and also its display in the GUI. A class that implements this interface may have an empty constructor, in some embodiments of the present invention.

Other interfaces, such as one for defining how conflicts may be handled, are also within the scope of embodiments of the present invention. This may be used if multiple policies are created for the same resource. The conflict resolution may be per organization and may be based on priority of the policies, resource name being accessed, and the schema of the action values. Embodiments of the present invention provide for a pluggable architecture, in which customers are able to customize conflict resolution based on various parameters. For example, conflict resolution may be based only on priority, or exact resource name match, or least restrictive (e.g., if there is a single deny the policy results will be a deny), or a combination of them.

During policy evaluation, a policy engine may walk a resources tree and identify the policies that apply to the user based on a token and also satisfying the constraints. The identified policies may then be processed through the conflict resolution to obtain the final policy results. As discussed earlier, the parameters used in the conflict resolution may be policy priority, resource name being accessed, and the action values. Of these, policy priority and resource names may be well defined and can be explicitly used by the conflict resolver plugin (e.g., FIG. 2, 255).

However, the action values could be Boolean, single-valued, or multi-valued. Hence, the conflict resolver may specify the type of action values that can be applied (or a combination of them). The conflict resolution may be, for example, Boolean conflict resolution, single-valued conflict resolution, multi-valued conflict resolution.

Exemplary conflict resolution plugins may be creating a union of the values, intersection of the values, or a combination of the values. Additionally, the conflict resolution plugins may use priority and resource name matches to determine the policy results. For example, a Boolean plugin may first narrow the action values based on priority and/or closest resource name matches and then apply either most restrictive or least restrictive rules. Those of ordinary skill in the art will recognize that there are many ways to practice a conflict resolution plug-in within the scope of embodiments of the present invention.

Figure 4:
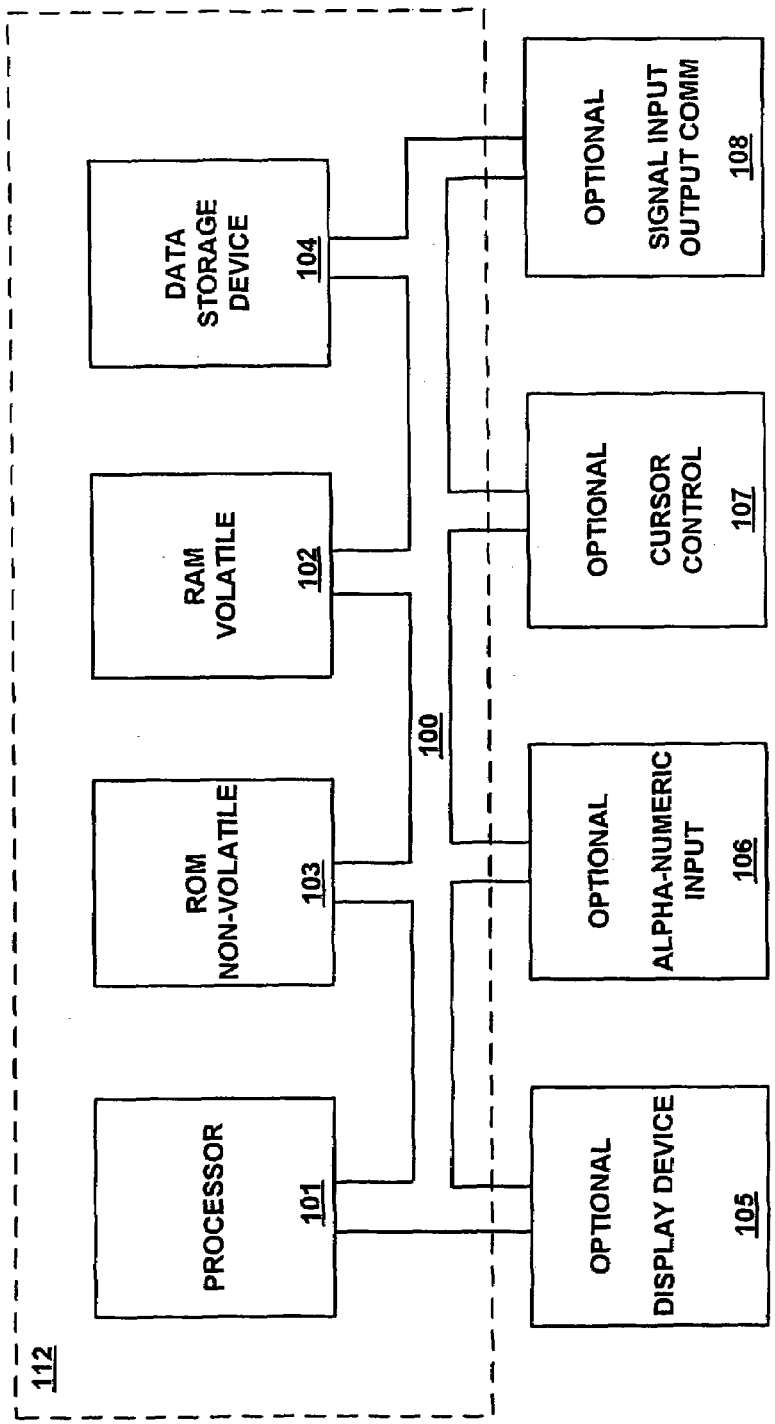
FIG. 4 is a logical block diagram of an exemplary computer system that may be used to implement embodiments of the present invention.

Referring now to FIG. 4, a block diagram of exemplary computer system 112 is shown. It is appreciated that computer system 112 of FIG. 4 described herein illustrates an exemplary configuration of an operational platform upon which embodiments of the present invention can be implemented. Nevertheless, other computer systems with differing configurations can also be used in place of computer system 112 within the scope of the present invention. For example, computer system 112 could be a server system, a personal computer or an embedded computer system such as a mobile telephone or pager system.

Computer system 112 includes an address/data bus 100 for communicating information, a central processor 101 coupled with bus 100 for processing information and instructions, a volatile memory unit 102 (e.g., random access memory, static RAM, dynamic RAM, etc.) coupled with bus 100 for storing information and instructions for central processor 101 and a non-volatile memory unit 103 (e.g., read only memory, programmable ROM, flash memory, EPROM, EEPROM, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions. In one embodiment of the present invention, data storage device 104 is a cache memory.

Also included in computer system 112 of FIG. 4 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface 108, which is also coupled to bus 100, and can be a serial port. Communication interface 108 can also include number of wireless communication mechanisms such as infrared or a Bluetooth protocol.

Although the embodiments of the present invention may be implemented in a variety of different electronic systems such as a mobile computer system, an embedded system, etc., one exemplary embodiment includes the implementation on a computer server system. It should be understood that the descriptions corresponding to FIG. 4 provide some general information about an exemplary computing system.

Embodiments of the present invention, a plugin architecture for allowing extensions to polices have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer readable medium having stored therein computer implementable instructions for executing a policy component, said policy component comprising:
   a first policy decision point for evaluating and enforcing pre-defined policies used to control access to a resource; and
   a plurality of interfaces for extending the pre-defined policies to obtain customized policies for controlling access to the resource,
   wherein each of said customized policies comprises:
      a rule that references the resource and comprises at least one action associated with the resource,
      a condition that comprises a constraint on the at least one action,
      a subject that defines a collection of users to whom each of the customized policies apply, and
      a referral that comprises an identification of a second policy decision point to which the evaluation of each of the customized policies is to be delegated, and
   wherein said policy component is operable to receive user defined customized policies and integrate said user defined customized policies into said second policy decision point,
   wherein the first policy decision point is different from the second policy decision point, and
   wherein the first policy decision point and the second policy decision point each comprise at least one selected from a group consisting of a policy product and an organization.

2. A computer readable medium as in claim 1, wherein said plurality of interfaces comprise an interface for defining the subject in said second policy decision point.

3. A computer readable medium as in claim 1, wherein said plurality of interfaces comprise an interface for defining the condition in said second policy decision point.

4. A computer readable medium as in claim 1, wherein said plurality of interfaces comprise an interface for defining the referral in said second policy decision point.

5. A computer readable medium as in claim 1, wherein said plurality of interfaces comprise an interface for defining a structure for resolving conflicts in at least one of said first policy decision point and said second policy decision point.

6. A computer readable medium as in claim 1, wherein said plurality of interfaces comprise an interface for defining resource names in at least one of said first policy decision point and said second policy decision point.

7. A computer readable medium as in claim 1, wherein said plurality of interfaces are implemented in a substantially compliant version of the JAVA programming language.

8. An architecture for extending policies comprising:
   a computer readable medium having stored thereon instructions for implementing:
      a first policy decision point for evaluating and enforcing pre-defined policies used to control access to a resource; and
      a plurality of plugin modules for allowing a user to extend the pre-defined policies to obtain customized policies for controlling access to the resource,
      wherein each of said customized policies comprise:
         a rule that references the resource and comprises at least one action associated with the resource,
         a condition that comprises a constraint on the at least one action,
         a subject that defines a collection of users to whom each of the customized policies apply, and
         a referral that comprises an identification of a second policy decision point to which the evaluation of each of the customized policies is to be delegated; and
      wherein said plurality of plugin modules is operable to present interfaces to said user for customizing said policies and is further operable to integrate customized policies into a framework of said second policy decision point in response to user input based on said interfaces,
      wherein the first policy decision point is different from the second policy decision point, and
      wherein the first policy decision point and the second policy decision point each comprise at least one selected from a group consisting of a policy product and an organization.

9. An architecture as in claim 8, wherein said plurality of plugin modules comprise a plugin for customizing subjects in at least one policy of said customized policies.

10. An architecture as in claim 8, wherein said plurality of plugin modules comprise a plugin for customizing conditions in at least one policy of said customized policies.

11. An architecture as in claim 8, wherein said plurality of plugin modules comprise a plugin for customizing referrals in at least one policy of said customized policies.

12. An architecture as in claim 8, wherein said plurality of plugin modules comprise a plugin for customizing conflict resolution in at least one policy of said customized policies.

13. An architecture as in claim 8, wherein said plurality of plugin modules comprise a plugin for customizing resource names in at least one policy of said customized policies.

14. A computer implemented method for allowing policy customization, comprising:
   providing an interface for defining customized policies in a policy program, in response to a request for said interface, wherein said customized policies are obtained by extending pre-defined policies that are used to control access to a resource and evaluated by a first policy decision point wherein said customized policies comprise:
      a rule that references the resource and comprises at least one action associated with the resource,
      a condition that comprises a constraint on the at least one action,
      a subject that defines a collection of users to whom each of the customized policies apply, and
      a referral that comprises an identification of a second policy decision point to which the evaluation of each of the customized policies is to be delegated;
   receiving a user supplied policy definition that is compliant with said interface; and
   integrating said user supplied policy definition into said policy program,
   wherein the first policy decision point is different from the second policy decision point, and
   wherein the first policy decision point and the second policy decision point each comprise at least one selected from a group consisting of a policy product and an organization.

15. A computer implemented method as in claim 14, wherein said interface is for defining subjects in said policy program.

16. A computer implemented method as in claim 14, wherein said interface is for defining conditions in said policy program.

17. A computer implemented method as in claim 14, wherein said interface is for defining referrals in said policy program.

18. A computer implemented method as in claim 14, wherein said interface is for defining a structure for resolving conflicts in said policy program.

19. A computer implemented method as in claim 14, wherein said interface is for defining resource names in said policy program.

20. A computer implemented method as in claim 14, wherein said interface is implemented in a substantially compliant version of the JAVA programming language.

21. A computer readable medium having stored therein instructions which when executed on a processor implement a method of allowing policy extension, said method comprising the steps of:
   instantiating a policy program for executing a plurality of pre-defined policies used to control access to a resource, wherein the plurality of pre-defined policies are evaluated by a first policy decision point;
   providing an interface for extending a first policy of said plurality of pre-defined policies;
   receiving an extension to said first policy, said extension based on said interface; and
   integrating said extension to said first policy into said policy program to obtain a first customized policy for controlling access to the resource, wherein the first customized policy comprises:
      a rule that references the resource and comprises at least one action associated with the resource,
      a condition that comprises a constraint on the at least one action,
      a subject that defines a collection of users to whom each of the customized policies apply, and
      a referral that comprises an identification of a second policy decision point to which the evaluation of each of the customized policies is to be delegated,
   wherein the first policy decision point is different from the second policy decision point and
   wherein the first policy decision point and the second policy decision point each comprise at least one selected from a group consisting of a policy product and an organization.

22. A computer readable medium as in claim 21, wherein said providing an interface further comprises providing a selection to a user between a plurality of interfaces for extending policies of said plurality of pre-defined policies.

23. A computer readable medium as in claim 22, wherein said providing an interface further comprises:
   in response to a selection from said user, providing to said user a subject interface that is for defining subjects in said policy program.

24. A computer readable medium as in claim 22, wherein said providing an interface further comprises:
   in response to a selection from said user, providing to said user a condition interface that is for defining conditions in said policy program.

25. A computer readable medium as in claim 22, wherein said providing an interface further comprises:
   in response to a selection from said user, providing to said user a referral interface that is for defining referrals in said policy program.

26. A computer readable medium as in claim 22, wherein said providing an interface further comprises:
   in response to a selection from said user, providing to said user a conflict resolution interface that is for defining a structure for resolving conflicts in said policy program.

27. A computer readable medium as in claim 22, wherein said providing an interface further comprises:
   in response to a selection from said user, providing to said user a resource name interface that is for defining resource names in said policy program.

* * * * *

UNITED STATES PATENT AND TRADEMARK OFFICE
CERTIFICATE OF CORRECTION

PATENT NO. : 7,296,235 B2  Page 1 of 1
APPLICATION NO. : 10/269152
DATED : November 13, 2007
INVENTOR(S) : Shivaram Bhat et al.

It is certified that error appears in the above-identified patent and that said Letters Patent is hereby corrected as shown below:

On the Title Page, Item (54) Title, line 2, the word "Polices" should be

--Poli*cies*--.

On the Title Page, Item (57) Abstract, line 3, the word "polices" should be

--poli*cies*--.

On the Title Page, Item (57) Abstract, line 4, the word "polices" should be

--poli*cies*--.

On the Title Page, Item (57) Abstract, line 6, the word "polices" should be

--poli*cies*--.

On the Title Page, Item (57) Abstract, line 7, the word "polices" should be

--poli*cies*--.

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,296,235 B2 | Page 1 of 1 |
| APPLICATION NO. | : 10/269152 | |
| DATED | : November 13, 2007 | |
| INVENTOR(S) | : Shivaram Bhat et al. | |

It is certified that error appears in the above-identified patent and that said Letters Patent is hereby corrected as shown below:

On the Title Page, Item (54) and Column 1, line 2 Title, the word "Polices" should be --**Poli*cies***--.

On the Title Page, Item (57) Abstract, line 3, the word "polices" should be --**poli*cies***--.

On the Title Page, Item (57) Abstract, line 4, the word "polices" should be --**poli*cies***--.

On the Title Page, Item (57) Abstract, line 6, the word "polices" should be --**poli*cies***--.

On the Title Page, Item (57) Abstract, line 7, the word "polices" should be --**poli*cies***--.

This certificate supersedes the Certificate of Correction issued April 15, 2008.

Signed and Sealed this

Sixth Day of May, 2008

JON W. DUDAS
*Director of the United States Patent and Trademark Office*